310-10 SR
F213A XR 3,336,509
METHOD AND MEANS FOR OBTAINING HIGH MAGNETIC FIELDS
Filed Sept. 8, 1964
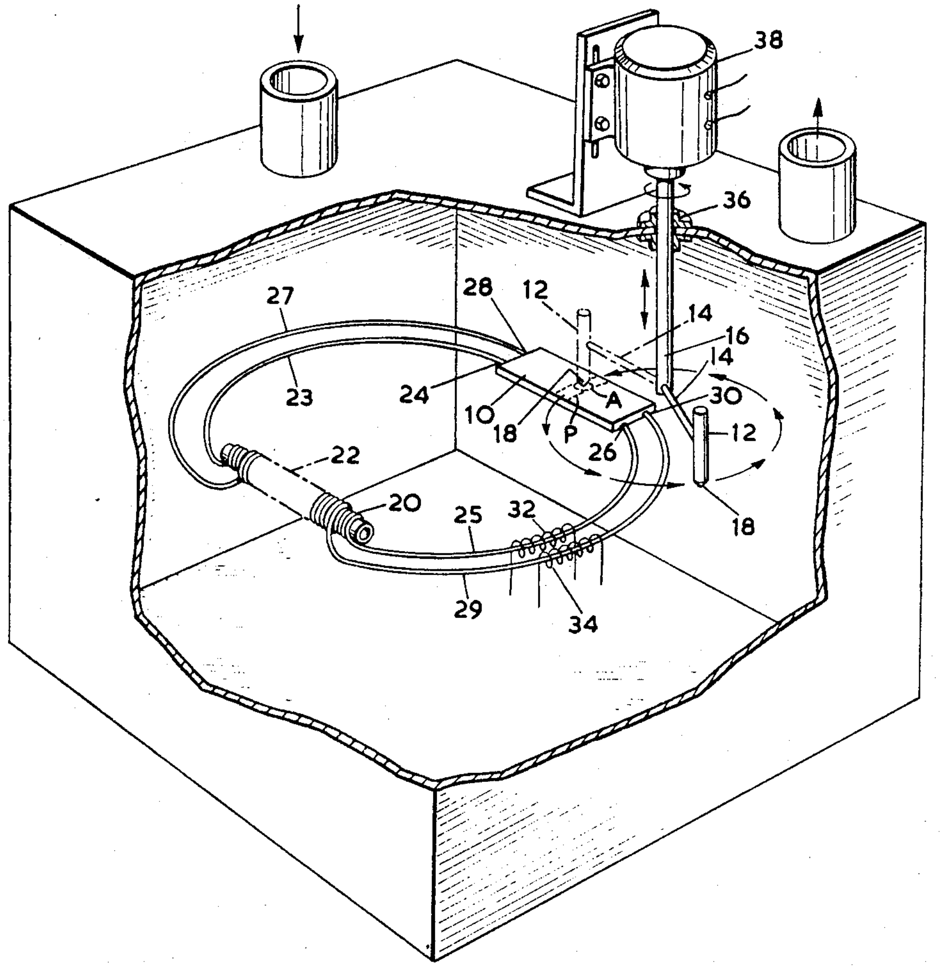
INVENTOR.
DAVID L. ATHERTON
BY R. L. Westell
PATENT AGENT United States Patent Office 3,336,509
Patented Aug. 15, 1967

3,336,509

METHOD AND MEANS FOR OBTAINING HIGH MAGNETIC FIELDS

David L. Atherton, Toronto, Ontario, Canada, assignor to Ferranti-Packard Electric Limited, Toronto, Ontario, Canada, a corporation of Canada Filed Sept. 8, 1964, Ser. No. 394,912
15 Claims. (Cl. 317—123)

ABSTRACT OF THE DISCLOSURE

A magnetic field is caused to move in a closed route over a superconducting circuit with a normalizable superconducting member completing circuits through two or more superconducting lengths maintained in a cryogenic environment. The field is designed to pass into or out of the circuits across the normalizable member over one part of the route, thus changing the field but to pass in the opposite direction over the lengths without altering the enclosed field under normal conditions. The lengths which may each include a coil are arranged so that when considered in pairs, one of each pair is designed to enclose flux escaping from the other during an overload normal condition in the latter.

This invention relates to means for and a method of obtaining high magnetic fields using superconducting materials.

By superconducting materials are meant those materials which when cooled to temperatures of approximately 0–20° K. (the temperature varies with the material), exhibit no measurable electrical resistance as long as adjacent magnetic fields are below certain values and as long as electric current therein is below certain values. (Such values for field and current vary with the material involved.) When a superconducting material is in a superconducting state; it is, except for surface effects, impenetrable by magnetic flux but when the material changes from a superconducting to a non-superconducting state (known as the "normal" state), at the same time it becomes penetrable by magnetic flux.

By "flux penetrable area" is implied, an area permeable by magnetic flux. By "normal" is meant the state of a part or all of a material which under proper conditions would be superconducting but is not, at the time of reference, in the superconducting state. In other words a superconducting material or part thereof may either be in the "superconducting" state or in the "normal" state.

The value of magnetic field at 0° K. at which superconducting material becomes normal is known as the "critical field," and it will be appreciated that the value of the critical field must be obtained by extrapolation from experimental results at other temperatures, since the temperature 0° K. is not attainable. The temperature at zero magnetic field, above which superconducting material becomes normal is known as the "critical temperature." Although these are the proper definitions, of the terms "critical field" and "critical temperature" for convenience herein the term "critical field" is used to refer to the field above which the superconducting material will become normal at the then ambient temperature, while the term "critical temperature" is used to refer to the temperature at which superconducting material becomes normal in a given field.

With bodies made of superconducting materials or alloys it is found in some cases that for currents in the body above a certain value, the body goes normal even though the ambient temperature and field are below their critical values. The current value at which this takes place is known as the critical current.

The invention applies to any superconducting materials. Some of these are listed in a book, "Cryogenic Engineering," by Russell B. Scott, D. Van Nostrand Company Inc., 1960, at page 342.

It is known that if superconducting material in superconducting state surrounds a flux penetrable area then any flux passing through the area cannot escape or dissipate while the material in superconducting state forms a closed circuit about the area. Moreover, it is known that if a part of such enclosing superconducting material is a body of sufficient dimensions, then the additional magnetic field of a magnetic field source may, in the proper conditions of existing field and temperature, be used to create a localized normal area in the body when the proximity of the magnetic source and the strength of its field are sufficient to raise the field in the localized area above the critical field value. Through such localized normal area the magnetic flux paths may pass under the conditions described hereafter. With the source in proper proximity to create such a normal area, the area may be moved from one edge of the superconducting body (external to the superconducting circuit) to another internal to the superconducting circuit whereby the flux associated with the magnet may be added to that already "trapped" within the aforesaid closed superconducting circuit. If the dimensions of the superconducting body are sufficient that the normal area never completely breaks the superconducting connection supplied by the body to the closed circuit, and if the fields about and the currents in the superconductors are below the critical level for the superconducting materials and the dimensions thereof (including the superconducting portion of the body during the travel of the localized normal area thereacross), then an existing field, extending through the area enclosed by the superconducting circuit, may be increased or decreased (depending on the relative polarities of the two fields) by the field brought in with the movable magnetic source. The increase (or decrease) in field will be sustained if the magnetic source can then be moved to a position where its axis is again external to the superconducting circuit, without rendering a part of the encircling superconductor normal during such last mentioned movement; and the current in the closed superconducting circuit will, as a result, be correspondingly altered to a value to sustain the new entrapped field value. The process may be repeated, and the limits for such trapped field for a given temperature and material are determined by the critical field and/or the qualities, geometry and dimensions of the superconducting material.

It is an object of the invention to provide a device wherein an inner loop and a superconducting body which together form a closed superconducting circuit, the superconducting body being capable of being rendered normal in a localized area, are combined with an outer loop insulated (or spaced from the first loop) over most of its length but joined at both ends to the superconducting body to form with said body a closed superconducting circuit. A predetermined path is selected extending across the superconducting body for the travel of a normalized area hereinafter sometimes referred to as the normalizable path and the path is located to run between the connections from each loop to the conducting body and wherein the two loops are so arranged that flux escaping or caused to escape from the inner loop through a part of the inner loop becoming normal, will be retained within the outer loop assuming such outer loop is in superconducting state. As many loops may be provided, as desired, each located to receive flux which might outwardly escape from the next inner loop.

It is a preferred embodiment of the invention to provide that the magnetic field for creating the normal area is provided by a permanent magnet repeatedly movable through a closed route, a part of such route taking it over the superconducting body in sufficient proximity to create a movable normal area therein; and on another part of such route; out over the superconducting loops, where the magnet does not normalize the loops in passing thereover.

In this way, a magnetic field of either desired polarity may be increased or decreased inside the loops and in increments by simple movement of the magnet along the closed path. The size of the increments may be easily controlled by adjusting the spacing of the magnet from the superconducting body or by substitution of magnets. A different scale of increments may be obtained if another magnet is substituted for the one in use. The use of a permanent magnet may avoid any need for external current leads, hence the losses of refrigerant are reduced, no power supplies are required and controls are relatively simple. Thus there is provided a device which may be tuned for desired flux levels by varying the incremental steps and controlling, using or counteracting their cumulative effect.

It is an object of the invention to provide a device of the type previously described wherein the inner and outer loops include a helical coil and wherein the outer helical coil and loop are located to receive flux escaping from the inner. The coil connections to the superconducting body are such that the field passing through the inner coil and induced by current therein is in the same sense as the field induced by and passing through the outer coil. Similar coils located progressively outwards from the above coils and arranged in the manner described, may be added to the number desired.

In this way there may be provided a series of flux permeable areas, located respectively within the innermost coil and between successive adjacent relatively inner and outer coils, wherein the flux density values may be separately variable from outer to inner fields or where a number of the flux density values in such areas may be of the same amount. Thus fields defined by inward loops may be designed to operate at high value; but because of the outer loop design, the failure, by an extent going normal, of such inward loop does not necessarily cause failure of those loops to the outside of the loop which has failed. Thus by proper design of the loops, the release of heat and other risks and inconvenience entailed with sudden high loss of magnetic energy may be avoided, or considerably diminished.

By the use of such helical coils the increments of current created in the loops may be used to produce higher fields in the coils, of value greater than that with a simple loop.

In all of the above forms of the invention there may be provided, if desired, electric heating means acting to render localized extents of one or more of the loops normal, whereby flux density may equalize between areas which would otherwise be separated by such superconducting extents. The use of heaters will require external leads and hence the additional flexibility of control is gained at the expense of some leakage of heat into the enclosure along such leads.

In all of the forms of the development described above, the elements described are maintained in a tank or enclosed chamber arranged for and connected to apparatus which will provide temperatures to maintain the superconducting material used in the superconducting state, usually through the use of liquid helium. Where heaters are not used, the only "leads" or "connections" from inside to outside the tank or chamber are the helium connections themselves and the mechanical connection for repeatedly moving the magnet along the closed route. Usually the latter connection is achieved by mounting the magnet on a radial arm from a rotatable shaft which has an insulating extent in its connection to a motor outside the chamber. If desired the chamber may be designed so that the mechanical connection is avoided, by combining motor design with chamber design so that the stator of the electric motor is outside the chamber and the rotor of the motor with the magnetic arm attached, is inside the chamber.

Wherein, in this application, there is mentioned the increase of flux in a flux penetrable area through movement of a magnet along a closed route it will be realized that the flux in such areas may be decreased by a reversal of the direction of magnet movement in the same path or by maintaining the original magnet direction and reversing the polarity thereof.

Further it will be realized that the continued removal of flux of a given polarity from a flux penetrable area will cause (after the zero flux level is passed) the increase in flux of the other polarity.

In a drawing which illustrates a preferred embodiment of the invention:

In the drawing is shown a superconducting body comprising a flat thin sheet 10 which, over a part of its area, is substantially planar. A permanent magnet 12 is mounted on a radial arm 14 on a rotatable shaft 16 having one pole 18 projecting toward sheet 10 to an adjustable proximity to be discussed. The magnet 12 is therefore so mounted that its pole may be adjusted to the desired proximity to the planar part of sheet 10 and the magnet is selected, the material is selected and dimensioned and the proximity adjusted, so that when pole 18 is over the sheet 10 and the sheet is otherwise being maintained in a superconducting state, the magnet will create, in the vicinity of pole 18, a localized normal area A in sheet 10. On rotation of the arm 14 resulting in the movement of the pole across (i.e. over and in proximity to the sheet 10), the localized spot will move in the arcuate path P the "normalizable path" carrying with it the localized normal area A from a location on an edge to another location on an edge across sheet 10.

The preferred materials for sheet 10 are lead, niobium or tantalum, being materials which in superconducting state may in a localized area be rendered normal by a localized magnetic field which can in such area create a field higher than the then critical field value of the sheet.

On suitable coil form, with a flux permeable gap passing axially therethrough, are provided inner and outer helically wound coils 20 and 22 of superconducting wire, which may be of any superconducting material but are preferably formed of niobium stannide. The coils 20 and 22 are generally wound so that coil 22 extends about coil 20 when viewed along the mean direction of flux created by current in coil 20; and in the specific embodiment this is achieved by providing that the innermost turn of the outer coil 22 is not radially inward (relative to the helices) of the outermost turn of the inner coil 20. As functionally defined, the coils in general must be arranged so that flux escaping from the inner coil 20 through an extent thereof becoming normal, is enclosed within the helix of the outer coil 22, the leads 27 and 29 from such coil to plate 10, and plate 10. The ends of inner coil 20 are attached through leads 23 and 25 thereof at 24 and 26 to the sheet 10 on opposite sides of the normalizable path P. The ends of outer coil 22 are attached through leads 27 and 29 thereof at 28 and 30 to the sheet 10 to the opposite sides of the path P. The geometry of the connections of the "leads" from the coils to the connections is governed by the fact that leads 27 and 29 with coil 22 extend about leads 23 and 25 when viewed along the mean direction of flux created in the area enclosed by leads 23 and 25, coil 20 and plate 10 (defining together a closed superconducting circuit); and in the specific embodiment this is achieved by arranging leads 27 and 29 so that with coil 22 they will enclose any flux escaping from the leads 23 and 25 between coil 20 and sheet 10 or from coil 20.

Further leads and coils may be added forming third, fourth and/or additional loops. In each case the loop will (as specifically described above in relation to the two loops shown) be arranged to entrap flux escaping from the leads or coils of the next inner loop due to the normal state of an extent of a part of the leads or coil of such inner loop.

If desired, the leads 23, 25, 27 and 29 may be made of separate (superconducting) material from the coils 20–22, but this will be avoided, where possible, because of the inconvenience and expense of constructing joints in superconducting material. On the other hand the leads will be formed at 24–26–28–30 respectively, to sheet 10 and this or an equivalent junction cannot usually be avoided, since the sheet 10 will usually be of different material. The dimensions of sheet 10 are selected so that sheet 10 may carry on one or both sides of the design normal area A (at any point in its travel along path P), currents of the level permitted in the leads and coil, without the current value in the plate exceeding the critical value, under the design conditions of (a) magnetic field strength on the side of the sheet 10 enclosed by the superconducting circuits, and (b) the difference of field existing across sheet 10, or the current in it.

The leads 23, 25, 27, 29 are arranged relative to the travel of radial arm 14 and pole 18 so that the travel of pole 18 past the leads along its route from the inside to the outside of the superconducting circuits, does not render such leads normal. The leads are arranged so that currents flowing in the same sense relative to the direction in the sheet 10 across path P, create in the coils 20 and 22 flux in the same sense.

The leads and helical coils, constructed, as described, of superconducting material, are preferably copper plated.

Heaters 32 and 34 may if desired be provided on a lead of either or both of the inner and outer superconducting circuits.

The heaters 32 and 34 are connected, exteriorly of the enclosure, to a source of power not shown, and it will be understood that the heaters are used at the expense of heat leakage into the container along the heater leads.

The apparatus shown is contained in a helium tank 35 shown in phantom only since the construction of such tank and the supply of liquid helium thereto and withdrawal of gaseous helium thereafter to maintain the materials at superconducting temperatures, is well known to those skilled in the art. The level of liquid helium will, it is understood, be maintained at a height to cover the superconducting materials in the circuits.

The arm 14 is mounted on shaft 16 having an extent of low thermal conductivity material where it projects out of the tank. The bearing 36, where the insulating extent passes the wall of the insulating tank, is adjusted to allow rotation but will be designed to provide a good seal against gas leakage.

A motor 38, suitably mounted, is connected to rotate shaft 16 and arm 14.

In operation, the tank will be maintained at a temperature suitable to render the superconducting circuitry in superconducting state and this will usually be between 4° K. and 20° K. for most superconducting materials. A further limitation on the temperature chosen is that while maintaining all the circuitry superconducting it must maintain the lead sheet 10 at a level close enough to critical values of field and temperature to allow areas on normalizable path P to go normal in the proximity of pole 18.

In operation (with the tank so maintained, and with heaters 32 and 34 non-existent, or not in use), the motor is operated to move the magnet 12 and pole 18 in a circle travelling from outward to inward over the sheet 10 and from inward to outward over the leads.

Each travel of the pole 18 over sheet 10 along path P carries the flux creating the normal area A (passing through sheet 10) along path P into the inside of the loop connected to coil 20. However, since the superconducting connection between opposed leads 24 and 26 or between opposed leads 28 and 30 is not broken during the passage of the area A across the sheet 10, no flux already enclosed by one or the other of the loops can escape. As the pole 18 continues through its closed path, across the leads 25 and 27 in accord with the geometry of the leads and the selection of the material, these are not rendered normal, thus the new flux brought in by the magnet across the sheet 10 remains there. Thus with repeated rotations of the motor 34, the flux inside the inner superconducting circuit may be increased by increments and the current in the superconducting circuit for coil 20 will be increased to a value to maintain such field, the field and current being limited by a maximum value determined by the critical current through or the critical field adjacent the coil 20 or adjacent leads 23 and 25 at the operating temperatures.

The apparatus may be used in many other fields such as magnetohydrodynamic generators, masers, etc.

The increments of flux addition on each rotation of arm 14 may be finely adjusted by the adjustment of the spacing of the pole 18 from sheet 10 and coarsely by the substitution of a permanent magnet of different strength.

The polarity of the field created may be reversed by reversing the magnet polarity or by maintaining the polarity and reversing the direction of rotation.

In the operation so far described, the flux is carried into the inner loop. When as a result the current in the leads 23 or 25 or coil 20 reaches the critical value, an extent of the inner loop will go normal for a sufficient time to allow the escape of flux to the space between the inner and outer loops and the inner loop will become again superconducting. Accordingly the outer loop may be used in this way as a safety valve for flux overflow from the inner loop to prevent complete release of the energy in the field which could have costly and dangerous results, if instantaneously released into the helium tank.

Thus the energy and heat which would be devastating and dangerous if, suddenly released, may be safely limited by intermittent leakage outwardly across superconducting leads.

Alternatively the method described above may be used to provide stepped fields with flux densities increasing inward in predetermined increments across each boundary formed by a superconducting loop and higher fields may be obtained in this way than if the entire flux differential (between the inside of the inner loop and the outside of the outer loop) were over a single loop using superconducting material of a cross section equal to the total of the cross sections of the wire in the two or more loops arranged, as described, to encompass flux escaping from the next inner loop as described.

As an alternative to exceeding the critical current or field values to cause a normal extent in the inner loop and consequent flux overflow from an inner to an outer field, a heater 32 on the inner loop may be used to allow, from time to time, by rendering an extent of an inner loop normal, equalization of flux and later turned off to render the inner loop completely superconducting and to allow the inner flux penetrable area to be pumped to a still higher value.

Also with an internal loop heater on, various flux penetrable areas may be connected to the inner enclosed area and a number of areas filled with flux at high density simultaneously—with the heaters turned off for later selective increases of inwardly located areas if desired. If only two loops are used, the heater 32 only is used for flux equalization and the heater 34 would only be used to dissipate the field inside the outer loop.

Although the apparatus has been described with two loops including two coils, the invention includes more loops and/or coils with each outer loop and coil located to receive flux escaping from (respectively) the next inner loop or coil through the normality of part thereof. Thus the steps in flux density may be increased to a number corresponding to the number of loops.

While it has been suggested that the magnetic field for rendering the superconducting body normal will be rotatably moved; in, over and in close proximity to the superconducting body; and then out over another part of the superconducting circuits, it will be realized that the cycle might be: in, over and in close proximity to the superconducting body and then out over the same path, but, during outward travel, at a distance from the superconducting body which would not then create a normal area in the superconducting body.

The safety effect of an outer loop or coil on flux escaping from an inwardly located loop or coil may be achieved by providing sufficient differential in the outer enclosed flux penetrable area between the existing and the critical field and current levels to absorb additions to these by the leakage of flux from inner areas.

The design therefore provides flexibility of design and operation together with the safety provided by the design possibility for building a loop with capacity for field and current caused by the escape outwardly of flux without sudden and total release of all the energy in the loops.

I claim:

1. Means for producing high magnetic fields comprising:
a magnet moveable about a closed route relative to a superconducting body;
said magnet defining, in relation to its position and orientation, a predetermined field pattern;
said superconducting body being located in relation to said field pattern and said route to have, when in a superconducting state, a localized area thereof, rendered normal by said field, said magnet and said route being so located in relation to said body, that said area is moveable across said body as said magnet moves through a portion of said closed route;
a "normalizable" path defined by the movement of said localized area across said superconductor;
at least two lengths of superconductor each length being connected at opposite ends to said superconducting body on opposite sides of said "normalizable" path;
whereby each of said lengths forms a superconducting loop, one of said lengths when viewed in the mean direction of flux created by current therein, being enclosed by the other of said lengths and said body taken together; and means for maintaining said superconducting body and lengths below their critical temperature.

2. Means as claimed in claim 1 wherein each of said superconducting loops includes a coil formed of a plurality of turns; the coil of said one superconducting loop being enclosed within the coil of said other superconducting loop.

3. Means for producing high magnetic fields comprising:
a magnet moveable about a closed route relative to a superconducting body;
said magnet defining, in relation to its location and orientation, a predetermined field pattern;
said superconducting body being located, in relation to said field pattern and said route, to have, when in a superconducting state, a localized area thereof, driven normal, said magnet and said route being so located in relation to said route that said area is moveable across said body as said magnet is moved through a portion of said enclosed route;
a "normalizable" path defined by the movement of said localized area across said superconductor;
at least two lengths of superconductor each connected at opposite ends to said superconducting body on opposite sides of said "normalizable" path;
whereby a first of said lengths with said body forms a first superconducting loop, enclosing at least one flux path, and a second of such lengths forms a second superconducting loop so arranged in relation to said first loop (considered with said body) to enclose said first length.

4. Means as claimed in claim 3 wherein each of said superconducting extents includes a coil formed of a plurality of turns, with the coil from said second superconducting extent enclosing the coil from said first superconducting extent.

5. Means for producing high magnetic fields comprising:
a first coil comprising a length of superconducting material arranged to form a plurality of turns arranged in a predetermined helical sense about the axial direction of the gap in such coil;
and thereby defining a path through the coil for flux created by current therein;
a second coil comprising a length of superconducting material arranged to form a plurality of turns arranged in a predetermined helical sense about said first coil as viewed along the axis of said gap;
a superconducting body;
a normalizable path defined across said body;
one end of each of said first and second coils being connected by superconducting material to said superconducting body on one side of said path;
the other end of each of said first and second coils being connected by superconducting material to said superconducting body on the other side of said path;
the polarity of said helical coils being such that current in a given direction through said superconducting body, creates flux paths of the same sense through said coils.

6. Means as claimed in claim 5, wherein said connections to opposite ends of said superconducting body are so arranged that the second coil connections are outside said first coil connections when viewed in the directions of flux paths created by currents in the first connections.

7. A device as claimed in claim 5 in combination with means for repeatedly creating through a magnetic flux source a normal area in part only of said normalizable path and for moving said normal area relatively along said normalizable path from one end to the other, and means for returning said means after such movement to its location before said movement without moving a normal area in the opposite direction along said normalizable path.

8. Means for use in the production of high magnetic fields, comprising:
a first loop comprising a length of superconducting material;
joined at spaced locations to a superconducting body;
a second loop comprising a length of superconducting material;
joined at spaced locations to a superconducting body;
said loops being so arranged that most of the flux paths through said first loop created by current flowing in said first loop in the absence of current in said second will pass through said second loop;
a superconducting body;
a normalizable path defined across said body,
so arranged that: one end of each of said first and second loops is joined to said superconducting body on one side of said normalizable path, and
the other end of each of said first and second loops is joined to said superconducting body on the other side of said normalizable path;
the polarities of said loops being such that current in a given direction through said superconducting body creates flux paths of the same sense through said loops.

9. A device, as claimed in claim 8, wherein each of said loops includes a helical coil and wherein most of the flux paths passing through the first loop coil and created by current in said first loop in the absence of current in said second loop pass through said second loop, and wherein the polarities of said coils are such that current in a given direction through said superconducting body creates flux paths of the same sense in both said coils.

10. A device, as claimed in claim 8, including means for repeatedly creating, through a magnetic flux source, a normal area in a part only of said normalizable path and for relatively moving said normal area along said normalizable path from one end to the other without a consequent reversal of the movement of a normal area along said path.

11. A device, as claimed in claim 9, including means for repeatedly creating through a magnetic flux source, a normal area in a part only of said normalizable path and for relatively moving said normal area along said path from one end to the other without a consequent reversal of the movement of a normal area along said normalizable path.

12. A method of creating magnetic fields of high flux density comprising: providing a first closed superconducting circuit including a superconducting body of appreciable width; providing a second closed superconducting circuit including said superconducting body whereby said circuits are in parallel; and arranging said circuits in such a manner that current through said superconducting body will create flux paths in the same sense through the common flux permeable area enclosed by both circuits; arranging said second circuit in such geometrical locations that flux escaping from said first loop through an extent thereof becoming normal, will be received within said second circuit.

13. Means for creating magnetic fields of high flux density comprising: a first closed superconducting circuit including a first helical coil and including a superconducting body of appreciable width; a second closed superconducting circuit including said superconducting body and a second helical coil, whereby said circuits are in parallel, said circuits being arranged in such a manner that current through said superconducting body will create flux paths in the same sense through both coils, arranging said second helical coil in such geometrical location that flux escaping from said first coil through an extent thereof becoming normal, will be received within said second circuit.

14. A method as claimed in claim 12 including maintaining the temperatures about said elements at temperatures rendering the elements forming said circuits in superconducting state, and causing magnetic flux of a strength and concentration to render a localized area of said superconducting body normal at said temperature, to render normal an area at one edge of said superconductor and causing said area to move relatively along a path to a different location on an edge of said superconductor, said path being chosen so that one end of the remainder of each of said circuits is connected to said superconducting body on one side of said path and the other end of the remainder of each of said circuits is connected to said superconducting body on the other side of said path.

15. Means as claimed in claim 13 including means for maintaining the temperatures about the elements forming said circuits at values rendering such elements superconducting; and means for producing magnetic flux of a strength and concentration to render a localized area of said superconducting body normal at such temperature values; and means for causing said area to move relatively along a path from an edge to a different location on an edge of said superconductor said path being located so that one end of the remainder of each of said circuits is connected to said superconducting body on one side of said path and the other end of the remainder of each of said circuits is connected to said superconducting body on the other side of said path.

References Cited

UNITED STATES PATENTS 3,292,021 12/1966 Hoag -------------- 310—40

MILTON O. HIRSHFIELD, *Primary Examiner.*

J. A. SILVERMAN, *Assistant Examiner.*